United States Patent
Reddy et al.

(10) Patent No.: US 6,176,315 B1
(45) Date of Patent: Jan. 23, 2001

(54) PREVENTING FLOW THROUGH SUBTERRANEAN ZONES

(75) Inventors: Baireddy R. Reddy, Edmond; Larry S. Eoff, Duncan; Jiten Chatterji, Duncan; San T. Tran, Duncan; E. Dwyann Dalrymple, Duncan, all of OK (US)

(73) Assignee: Halliburton Energy Services, Inc., Duncan, OK (US)

( * ) Notice: Under 35 U.S.C. 154(b), the term of this patent shall be extended for 0 days.

(21) Appl. No.: 09/205,467

(22) Filed: Dec. 4, 1998

(51) Int. Cl.$^7$ .................................. E21B 33/138
(52) U.S. Cl. ................. 166/295; 166/200; 507/902; 523/130
(58) Field of Search ................. 166/288, 294, 166/295, 300; 507/902; 523/130

(56) References Cited

U.S. PATENT DOCUMENTS

| | | | |
|---|---|---|---|
| 4,461,351 | 7/1984 | Falk | 166/295 |
| 4,664,713 | 5/1987 | Almond et al. | 106/209 |
| 4,683,949 * | 8/1987 | Sydansk et al. | 166/295 X |
| 4,723,605 * | 2/1988 | Sydansk | 166/295 |
| 4,773,481 | 9/1988 | Allison et al. | 166/270 |
| 4,799,550 | 1/1989 | Harris et al. | 166/300 |
| 4,844,168 * | 7/1989 | Sydansk | 166/295 X |
| 4,934,456 * | 6/1990 | Moradi-Araghi | 166/288 X |
| 5,133,408 | 7/1992 | Tackett | 166/270 |
| 5,146,986 | 9/1992 | Dalrymple | 166/294 |
| 5,181,568 | 1/1993 | McKown et al. | 166/293 |
| 5,217,632 * | 6/1993 | Sharif | 507/902 X |
| 5,246,073 * | 9/1993 | Sandiford et al. | 166/300 X |
| 5,304,620 | 4/1994 | Holtmyer et al. | 527/310 |
| 5,335,726 | 8/1994 | Rodrigues | 166/295 |
| 5,762,141 * | 6/1998 | Hutchins et al. | 166/295 |

* cited by examiner

*Primary Examiner*—George Suchfield
(74) *Attorney, Agent, or Firm*—Craig W. Roddy; C. Clark Dougherty, Jr.

(57) ABSTRACT

The present invention provides methods of preventing the flow of water or gas or both through a subterranean zone having a high temperature and a depth such that a long pumping time is required to place a sealing composition therein. The methods basically comprise the steps of preparing a polymeric sealing composition comprised of water, a cross-linking agent and a selected water-soluble polymer which reacts with the cross-linking agent and forms a sealing gel which is stable for a desired period of time at the temperature of the zone and has a pumping time before gelation in the presence of the cross-linking agent whereby the composition can be pumped to the depth of the zone and placed therein. Thereafter, the sealing composition is pumped into the zone and allowed to form a sealing gel therein.

19 Claims, No Drawings

PREVENTING FLOW THROUGH SUBTERRANEAN ZONES

BACKGROUND OF THE INVENTION

1. Field of the Invention

The present invention relates to improved methods of preventing water and/or gas flow through a subterranean zone, and more particularly, to such methods wherein the subterranean zone has a high temperature and is at a depth requiring a long pumping time.

2. Description of the Prior Art

The production of water with oil and/or gas from wells constitutes a major problem and expense in the production of oil and gas. While oil and gas wells are usually completed in hydrocarbon producing formations, when there is a water producing zone adjacent to the hydrocarbon producing formation, the higher mobility of the water often allows it to flow into the hydrocarbon producing formation by way of natural fractures and high permeability streaks. In the production of such wells, the ratio of water to hydrocarbons recovered often becomes so high that the cost of producing the water, separating it from the hydrocarbons and disposing of it represents a significant economic loss.

In order to reduce the production of undesired water and/or gas from hydrocarbon producing formations, aqueous polymer solutions containing cross-linking agents have been utilized heretofore. Such aqueous polymer solutions have been pumped into the hydrocarbon producing formations so that they enter water and/or gas zones within and adjacent to the formations and cross-link therein. The cross-linking of the polymer solutions causes them to form stiff gels which stop or reduce the flow of the undesired water and/or gas.

While the use of aqueous polymer solutions for reducing the production of undesired formation water and/or gas has achieved varying degrees of success, the cross-linking agents used to cross-link the polymer have often contained chromium or phenol/formaldehyde. These cross-linking agents are undesirable in that they either have high toxicities or produce cross-linked gels having low gel stabilities at high temperatures.

In addition, the aqueous polymer compositions utilized heretofore for reducing the production of undesired water and/or gas from subterranean zones having high temperatures and requiring long pumping times have often been unsuccessful. That is, the compositions have not produced gels which remain stable at the high temperatures involved and/or they have not had the required pumping time at the high temperatures to reach and be placed in the subterranean zone.

Thus, there is a continuing need for improved methods of preventing water flow through subterranean zones.

SUMMARY OF THE INVENTION

The present invention provides improved methods of preventing undesired water and/or gas flow through a subterranean zone having a high temperature and penetrated by a well bore at a depth such that a long pumping time is required to place a sealing composition therein. The methods basically comprise preparing a polymeric sealing composition comprised of water, a cross-linking agent and a selected water soluble polymer or mixture of polymers which reacts with the cross-linking agent and forms a sealing gel which is stable for a desired period of time at the temperature of the subterranean zone and has a pumping time before gelation in the presence of the cross-linking agent whereby the composition can be pumped to the depth of the zone and placed therein. Thereafter, the sealing composition is pumped into the zone by way of a well bore penetrating it and the sealing composition is allowed to form a cross-linked gel in the zone.

Depending upon the temperature of the subterranean zone to be sealed and the pumping time required, a selected type of water and a selected water soluble polymer are used. The water is selected from fresh water, unsaturated salt water and saturated salt water. While various water soluble polymers can be utilized, suitable such polymers are polyacrylamide, AMPS®/acrylamide copolymers, sulfonated styrene/maleic anhydride copolymers, vinylpyrrolidone/AMPS®/acrylamide terpolymers and AMPS®/N-N-dimethylacrylamide/acrylamide terpolymers. The cross-linking agent utilized is preferably selected from the group of polyalkyleneimines, polyalkylenepolyamides and mixtures thereof.

In order to reduce the pumping time of a sealing composition of this invention while maintaining the temperature at which a stable gel is formed, a gelation accelerating agent can be included in the sealing composition. The weight ratio of polymer to cross-linker can also be varied to lengthen or shorten the pumping time.

Thus, it is a general object of the present invention to provide improved methods of preventing undesired water and/or gas flow through a subterranean zone.

Other and further objects, features and advantages of the present invention will be readily apparent to those skilled in the art upon a reading of the description of preferred embodiments which follows.

DESCRIPTION OF PREFERRED EMBODIMENTS

The present invention provides methods of preventing undesired water and/or gas flow through a subterranean zone having a high temperature and penetrated by a well bore at a depth such that a long pumping time is required to place a sealing composition therein. The term "high temperature(s)" is used herein to mean a temperature in the range of from about 150° F. to about 500° F. The term "long pumping time(s)" is used herein to mean a pumping time in the range of from about 2 hours to about 14 days. The "pumping time" is the length of time between when a polymeric sealing composition of this invention is prepared and when the composition forms a gel and can no longer be pumped into or through a porous rock formation without fracturing the formation.

The methods of this invention basically comprise the steps of preparing a polymeric sealing composition comprised of water, a cross-linking agent and a selected water soluble polymer or mixture of polymers which reacts with the cross-linking agent and forms a sealing gel which is stable for a desired period of time at the temperature of the zone and has a pumping time before gelation in the presence of the cross-linking agent whereby the composition can be pumped to the depth of the zone and placed therein. Thereafter, the sealing composition is pumped into the zone by way of the well bore penetrating it and is allowed to form a cross-linked sealing gel in the zone.

The present invention is based on the discovery that the temperature at which gelation occurs, the length of time the resulting gel is stable and the pumping time of an aqueous polymer composition containing a cross-linking agent can all be controlled by the proper selection of the water and the polymer or polymers utilized in the composition. The water can be selected from fresh water, unsaturated salt water and saturated salt water, and the polymer or polymers can be selected from homopolymers, copolymers, terpolymers and mixtures thereof. By increasing the level of bulky and/or less reactive monomers in the selected polymer or polymers utilized, the temperature at which the polymer compositions form a gel can be raised, the pump times can be increased at a particular temperature and/or the stability of the gel at a particular temperature can be reduced or increased. A relatively short gel stability can be utilized for temporarily sealing a subterranean zone while a gel having long term stability can be used for sealing a subterranean zone for an extended period of time.

In addition to the particular types of water and polymer utilized in the sealing composition, the gel time and gel stability can be varied by varying the polymer to cross-linking agent weight ratio in the sealing composition and/or including a gelation accelerating agent in the composition.

The sealing compositions useful in accordance with the present invention are comprised of water, a cross-linking agent and a selected water soluble polymer or mixture of polymers which reacts with the cross-linking agent and forms a sealing gel that has a desired pumping time before gelation and is stable for a desired period of time at the temperature of the subterranean zone in which it is placed.

The water in the sealing composition can be fresh water, unsaturated salt water or saturated salt water. The particular type of water utilized changes the pumping time of the sealing composition before gelation occurs. Generally, the pumping time increases with increasing salt concentration in the water. The water can contain one or more salts such as potassium chloride, ammonium chloride and sodium chloride, or it can be brine or seawater.

A variety of water soluble polymers can be utilized in accordance with the present invention. Examples of suitable such polymers include, but are not limited to, polyacrylamide, AMPS®(2-acrylamido-2-methylpropane sulfonic acid)/acrylamide copolymers, sulfonated styrene/maleic anhydride copolymers, vinylpyrrolidone/AMPS®/acrylamide terpolymers and AMPS®/N-N-dimethylacrylamide/acrylamide terpolymers. Generally, by increasing the fraction of bulky or less reactive monomers in the polymer, the temperature at which gelation occurs can be increased, the pumping time at a given temperature can be increased and/or the stability of the gel formed can be increased or decreased. For example, when a subterranean zone to be sealed has a temperature in the range of from about 70° F. to about 230° F. and requires a pumping time in the range of from about 2 hours to about 96 hours, the water soluble polymer utilized in the sealing composition can be polyacrylamide or AMPS®/acrylamide copolymer. When the subterranean zone has a temperature in the range of from about 200° F. to about 350° F. and requires a pumping time in the range of from about 2 hours to about 14 days, the water soluble polymer can be a sulfonated styrene/maleic anhydride copolymer, a vinyl pyrrolidone/AMPS®/acrylamide terpolymer, an AMPS®/N-N-dimethylacrylamide/acrylamide terpolymer or a mixture of such polymers.

While various cross-linking agents can be utilized in accordance with the present invention, non-toxic organic cross-linking agents which are free from metal ions and the like are generally preferred. Examples of such organic cross-linking agents are polyalkyleneimines, polyalkylenepolyamines and mixtures thereof. In addition, water-soluble polyfunctional aliphatic amines, arylalkylamines and heteroarylalkylamines can be utilized. Of these, polyalkyleneimines are preferred with polyethyleneimine being the most preferred cross-linking agent for use in accordance with this invention.

Generally, the water soluble polymer utilized is included in a sealing composition of this invention in an amount in the range of from about 0.5% to about 20% by weight of the composition. When the cross-linking agent is an organic polymer such as polyethyleneimine, it is included in the sealing composition in an amount in the range of from about 0.05% to about 15% by weight of the composition.

As mentioned above, the weight ratio of water soluble polymer to cross-linking agent can be varied to change the pumping time before gelation and other properties of the sealing composition. When the cross-linking agent is polyethyleneimine, the weight ratio of the water soluble polymer used to the cross-linking agent can be varied in the range of from about 10:1 to about 400:1 to achieve desired results.

The gelation accelerating agent mentioned above which can be utilized to reduce pumping time before gelation at a given temperature can be a pH control compound such as an alkali metal carbonate, bicarbonate or hydroxide, a mineral acid such as hydrochloric acid, an organic acid such as acetic acid, a Lewis acid such as boric acid or other compounds such as ammonium chloride, urea and lactose. of these, boric acid is preferred. When utilized, boric acid is added to the sealing compositions of this invention in a general amount in the range of from about 0.005% to about 0.1% by weight of the composition.

In order to further illustrate the methods and sealing compositions of this invention, the following examples are given.

EXAMPLE 1

Polymeric sealing compositions of the present invention were prepared utilizing fresh water or unsaturated potassium chloride salt water and a polyacrylamide polymer. The polyacrylamide polymer utilized was a solid comprised of 90 mole percent acrylamide and 10 mole percent acrylate salt from acrylamide hydrolysis. The molecular weight of the polymer was 5,000,000. The cross-linker utilized in the sealing composition was polyethyleneimine.

The polymer solutions which were tested were prepared by mixing the solid polymer with the water in a blender for the time period required to completely disperse and dissolve the polymer in the water. The quantities of water and polymer utilized were such that the resulting solution contained polymer in an amount of 0.7% by weight of the solution. If a gelation accelerator was included in the polymer solution, it was added followed by the cross-linking agent with a few minutes additional mixing in the blender. Thereafter, the pumping time of the gel, i.e., the time required for the polymer composition to gel at a specific temperature, was measured using one of three different pumping time measurement procedures as follows.

MEHTOD A-BROOKFIELD VISCOSITY METHOD

About 300 milliliters of the polymer composition to be tested were placed in a 400 milliliter beaker. The beaker was then inserted into a preheated, thermostat controlled Brookfield viscometer equipped with a No. 2 spindle. The polymer solution was stirred at a rate of 10 rpm and the variation in viscosity was monitored at temperature as a function of time. The time required to reach a viscosity of 5,000 centipoises was taken as the pumping time.

METHOD B-TORQUE RHEOMETER METHOD

In accordance with this method, a torque rheometer capable of heating the polymer solution tested to temperatures in excess of the boiling point of water and high pressures (up to 10,000 psi) was used to monitor the gelation of the polymer composition by measuring changes in torque as a function of time at a given temperature. The viscosity changes were measured in Bearden units (Bc). The polymer composition was considered to be gelled when its consistency reached 50 Bc.

METHOD C-SEALED TUBE METHOD

A 16 mm×150 mm borosilicate glass tube with a screw cap or a 10.2 centimeter pressure tube with a screw cap was filled to about one-half full with polymer composition to be tested. The tube was purged with nitrogen and the screw cap was sealed with a high temperature silicone cement. In addition, a TEFLON® plug was used inside the cap. The tube was placed in a steel bomb and the bomb was placed in a preheated oven at the test temperature. The tube and sealing composition were heated in the oven and periodically, the steel bomb was removed from the oven and the tube was removed from the bomb and allowed to cool below about 150° F. Thereafter, the tube was inspected by turning it 90° from the upright position and measuring the % gelation. This measurement was accomplished by using the following equation: % gelation=$100\times[(L-T)/(L-H)]$ wherein T is the length of the liquid/gel level when the tube is in the horizontal position, L is the length of the tube and H is the height of the initial fluid column when the tube is in the vertical position. The time needed to reach a % gelation of 94% or higher was taken as the pumping time.

If syneresis of a gel took place after it was formed, the syneresis was measured in the same way as described in Method C above except that H in the equation represents the height of the gel column prior to aging the gel at a given temperature.

The results of the pumping time tests as well as the polymer composition components and quantities of components are given in Table I below.

TABLE I

Pumping Time Tests Using Acrylamide Polymer and Polyethyleneimine Cross-Linking Agent

| Test No. | Cross-linking Agent Concentration, % by wt. of Polymer Composition | Type of Gelation Accelerator Added-Quantity | Type of Water Used | pH of Polymer Solution Before Adding Cross-linking Agent | pH of Polymer Solution After Adding Cross-linking Agent | Temperature, °F. | Pumping Time, hrs. | Gel Stability and/or Comments |
|---|---|---|---|---|---|---|---|---|
| | | | EFFECT OF GELATION TEMPERATURE | | | | | |
| 1 | 0.47 | None | 2% KCl | — | — | 156 | 21.75[1] | — |
| 2 | 0.47 | None | 2% KCl | 5.56 | 10.1 | 176 | 11.53[1] | — |
| 3 | 0.47 | None | 2% KCl | — | — | 166 | 14.75[1] | — |
| 4 | 1.0 | None | Fresh Water | — | — | 200 | 3[2] | — |
| 5 | 1.0 | None | Fresh Water | — | — | 230 | 2.5[2] | Syneresis in 35 days |
| 6 | 1.0 | None | 2% KCl | — | — | 230 | 3[2] | Syneresis in 10 days |
| | | | EFFECT OF GELATION ACCELERATOR | | | | | |
| 7 | 0.47 | None | 2% KCl | — | — | 156 | 21.75[1] | — |
| 8 | 0.47 | Boric Acid - 0.12 g | 2% KCl | — | — | 158 | 13.72[1] | — |
| 9 | 0.47 | Sodium Carbonate - 2% by wt. | 2% KCl | — | 10.3 | 167 | 14.7[1] | — |
| 10 | 0.47 | diluted HCl | 2% KCl | — | 3.63 | 167 | 7.9[1] | — |
| | | | EFFECT OF CROSSLINKING AGENT CONCENTRATION | | | | | |
| 11 | 0.47 | None | 2% KCl | — | — | 156 | 21.75[1] | — |
| 12 | 0.24 | None | 2% KCl | — | — | 157 | 17[1] | — |

[1]Method A Used
[2]Method B Used

From Table I it can be seen that the polymer compositions containing polyacrylamide had different pumping times depending upon the temperature, the type of water utilized, the weight ratio of polymer to cross-linker and the pH of the composition.

EXAMPLE 2

The test procedure described in Example 1 was repeated except that the polymer utilized in the tests was a solid AMPS®/acrylamide copolymer containing 25 mole percent AMPS® and 75 mole percent acrylamide and having a molecular weight of 7,000,000. The results of these tests are given in Table II below.

EXAMPLE 3

The procedure described in Example 1 was repeated except that the polymer utilized in the tests was a solid vinylpyrrolidone/AMPS®/acrylamide terpolymer containing 30 mole percent vinylpyrrolidone, 60 mole percent AMPS® and 10 mole percent acrylamide and having a molecular weight of 5,000,000. The results of the tests showing the effects of temperature are given in Table III below.

TABLE II

Pumping Time Tests Using AMPS®/Acrylamide Polymer and Polyethyleneimine Cross-Linking Agent

| Test No. | Cross-linking Agent Concentration, % by wt. of Polymer Composition | Type of Gelation Accelerator Added-Quantity | Type of Water Used | pH of Polymer Solution Before Adding Cross-linking Agent | pH of Polymer Solution After Adding Cross-linking Agent | Temperature, °F. | Pumping Time, hrs. |
|---|---|---|---|---|---|---|---|
| | | | EFFECT OF GELATION TEMPERATURE | | | | |
| 1 | 0.47 | None | 2% KCl | 6.0 | 10.6 | 146 | 20.25[1] |
| 2 | 0.47 | None | 2% KCl | — | — | 167 | 8.33[1] |
| 3 | 0.47 | None | 2% KCl | — | — | 186 | 3.92[1] |
| | | | EFFECT OF GELATION ACCELERATOR | | | | |
| 4 | 0.47 | Boric Acid - 0.28 g | 2% KCl | — | 9.61 | 152 | 0.63[1] |
| 5 | 0.47 | Boric Acid - 0.28 g | 2% KCl | — | — | 123 | 0.58[1] |
| 6 | 0.47 | Boric Acid - 0.04 g | 2% KCl | — | — | 166 | 4.88[1] |
| 7 | 0.47 | 15% Hydrochloric Acid | 2% KCl | 2.6 | — | 160 | 9.67[1] |
| 8 | 0.47 | 1% Sodium Carbonate | 2% KCl | 9.37 | 10.6 | 160 | 15.25[1] |
| | | | EFFECT OF CROSSLINKING AGENT CONCENTRATION | | | | |
| 9 | 0.07 | Boric Acid - 0.03 g | 2% KCl | — | — | 176 | 1.7[1] |
| 10 | 0.7 | Boric Acid - 0.03 g | 2% KCl | — | — | 166 | 4.9[1] |
| | | | EFFECT OF TYPE OF WATER | | | | |
| 11 | 0.47 | None | 2% KCl | — | — | 186 | 3.9[1] |
| 12 | 0.47 | None | Sea Water[2] | 8.61 | 10.2 | 186 | 3.25[1] |
| 13 | 0.47 | Boric Acid - 0.28 g | 2% KCl | — | — | 152 | 0.63[1] |
| 14 | 0.47 | Boric Acid - 0.28 g | Sea Water[2] | — | 9.32 | 185 | 3.5[1] |

[1]Method A
[2]Synthetic Seawater

TABLE III

Pumping Time Tests Using Vinylpyrrolidone/AMPS ®/Acrylamide Terpolymer and Polyethyleneimine Cross-Linking Agent - Effects of Temperature

| Test No. | Cross-linking Agent Concentration, % by wt. of Polymer Composition | Type of Water Used | Temperature, °F. | Pumping Time[1], hrs. | Gel Stability and/or Comments |
|---|---|---|---|---|---|
| 1 | 2 | 2% KCl | 230 | — | Did not gel in 164 hrs. |
| 2 | 2 | 2% KCl | 275 | 336 | 29% Syneresis in 64 days |
| 3 | 2 | 2% KCl | 300 | 72 | Gel broke in 14 days (90% gelation) |
| 4 | 2 | 1% KCl | 260 | 120 | Stable (>84 days) |
| 5 | 2 | 1% KCl | 275 | 24 | 6% syneresis in 85 days |
| 6 | 1 | 2% KCl | 230 | — | Did not gel in 164 days |
| 7 | 1 | 2% KCl | 260 | 336 | Stable (>94 days) |
| 8 | 1 | 2% KCl | 275 | 96 | 12% Syneresis in 88 days |
| 9 | 1 | 2% KCl | 300 | 24 | Slight viscosity in 14 days |
| 10 | 1 | 2% KCl | 325 | 4 | Gel broke in 4 days |
| 11 | 1 | 1% KCl | 230 | 24 | Stable (>81 days) |
| 12 | 1 | 1% KCl | 260 | 21 | Stable (>81 days) |
| 13 | 1 | 1% KCl | 300 | 2 | Gel broke (chunks) in 23 hrs. |
| 14 | 1 | 0.5% KCl | 230 | 28 | Stable (>74 days) |
| 15 | 1 | 0.5% KCl | 275 | 24 | Stable (>81 days) |
| 16 | 1 | Fresh Water | 230 | 32 | Stable (>94 days) |
| 17 | 1 | Fresh Water | 260 | 28 | Stable (>94 days) |
| 18 | 0.5 | 2% KCl | 260 | 168 | Stable (>86 days) |
| 19 | 0.5 | 2% KCl | 275 | 72 | 12% Syneresis in 74 days |
| 20 | 0.5 | 2% KCl | 325 | 3 | Gel broke in 6 days |
| 21 | 0.5 | 1% KCl | 230 | 28 | Stable (>74 days) |
| 22 | 0.5 | 1% KCl | 260 | 48 | Stable (>74 days) |
| 23 | 0.5 | 1% KCl | 275 | 24 | Gel broke (chunks) |

[1]Method A

TABLE IV

Pumping Time Tests Using Vinylpyrrolidone/AMPS ®/Acrylamide Terpolymer and Polyethyleneimine Cross-Linking Agent - Effects of Type of Water

| Test No. | Cross-linking Agent Concentration, % by wt. of Polymer Composition | Type of Water Used | Temperature, °F. | Pumping Time[1], hrs. | Gel Stability and/or Comments |
|---|---|---|---|---|---|
| 1 | 1 | 2% KCl | 230 | — | Did not gel in 7 days |
| 2 | 1 | 0.5% KCl | 230 | 28 | Stable (>74 days) |
| 3 | 1 | Fresh Water | 230 | 32 | Stable (>94 days) |
| 4 | 0.5 | 2% KCl | 230 | 144 | Stable (>86 days) |
| 5 | 0.5 | 1% KCl | 230 | 28 | Stable (>74 days) |
| 6 | 1 | 2% KCl | 260 | 336 | Stable (>94 days) |
| 7 | 1 | 1% KCl | 260 | 21 | Stable (>81 days) |
| 8 | 1 | Fresh Water | 260 | 28 | Stable (>94 days) |
| 9 | 0.5 | 2% KCl | 260 | 168 | Stable (>86 days) |
| 10 | 0.5 | 1% KCl | 260 | 48 | Stable (>74 days) |
| 11 | 2 | 2% KCl | 275 | 336 | 29% Syneresis in 64 days |
| 12 | 2 | 1% KCl | 275 | 24 | 6% Syneresis in 85 days |
| 13 | 1 | 2% KCl | 275 | 96 | 12% Syneresis in 88 days |
| 14 | 1 | 1% KCl | 275 | 48 | 5% Syneresis in 88 days |
| 15 | 1 | 0.5% KCl | 275 | 24 | Stable (>81 days) |
| 16 | 1 | Fresh Water | 275 | 48 | Gel broke (chunks) |
| 17 | 0.5 | 2% KCl | 275 | 72 | 12% Syneresis in 74 days |
| 18 | 0.5 | 1% KCl | 275 | 24 | Gel broke (chunks) |
| 19 | 1 | 2% KCl | 300 | 24 | Slight viscosity in 14 days |
| 20 | 1 | 1% KCl | 300 | 2 | Gel broke (chunks) in 23 hrs. |

[1]Method A

The results of tests showing the effects of the type of water utilized are given in Table IV below.

The results of tests showing the effects of a gelation accelerator and the cross-linking agent concentration are given in Table V below.

TABLE V

Pumping Time Tests Using Vinylpyrrolidone/AMPS ®/Acrylamide Terpolymer and Polyethyleneimine Cross-Linking Agent - Effects of Gelation Accelerator and Cross-Linking Agent Concentration

| Test No. | Cross-linking Agent Concentration, % by wt. of Polymer Composition | Gelation Accelerator Added-Quantity | Type of Water Used | pH of Polymer Solution After Adding Cross-linking Agent | Temperature, °F. | Pumping Time[1], hrs. | Gel Stability and/or Comments |
|---|---|---|---|---|---|---|---|
| 1 | 0.47 | None | 2% KCl | 10.8 | 193 | 34 | — |
| 2 | 0.47 | Boric Acid - 0.28 g | 2% KCl | 9.8 | 196 | 13 | — |
| 3 | 0.25 | None | 2% KCl | — | 230 | 168 | Stable (>64 days) |
| 4 | 0.50 | None | 2% KCl | — | 230 | 144 | Stable (>86 days) |
| 5 | 1 | None | 2% KCl | — | 230 | — | Did not gel in 168 hr. |
| 6 | 2 | None | 2% KCl | — | 230 | — | Did not gel in 168 hr. |
| 7 | 0.5 | None | 1% KCl | — | 230 | 28 | Stable (>74 days) |
| 8 | 1 | None | 1% KCl | — | 230 | 24 | Stable (>74 days) |
| 9 | 1 | None | 2% KCl | — | 260 | 336 | Stable (>94 days) |
| 10 | 0.5 | None | 2% KCl | — | 260 | 168 | Stable (>86 days) |
| 11 | 0.25 | None | 2% KCl | — | 260 | 96 | Stable (>64 days) |
| 12 | 2 | None | 2% KCl | — | 275 | 336 | 29% Syneresis in 64 days |
| 13 | 1 | None | 2% KCl | — | 275 | 96 | 12% Syneresis in 88 days |
| 14 | 0.5 | None | 2% KCl | — | 275 | 72 | 12% Syneresis in 74 days |
| 15 | 1 | None | 2% KCl | — | 300 | 24 | Slight viscosity in 14 days |
| 16 | 2 | None | 2% KCl | — | 300 | 72 (90% gelation) | Gel broke in 14 days |
| 17 | 0.5 | None | 2% KCl | — | 325 | 3 | Gel broke in 6 days |
| 18 | 1 | None | 2% KCl | — | 325 | 4 | Gel broke in 4 days |
| 19 | 2 | None | 2% KCl | — | 325 | 15 | Weak gel |

[1]Method A

EXAMPLE 4

The test procedure described in Example 1 was repeated except that various polymers were utilized in the polymer compositions tested. The polymers utilized and the results of the tests are shown in Table VI below.

TABLE VI

Pumping Time Tests Using Various Copolymers and Terpolymers and Polyethyleneimine Cross-Linking Agent[1]

| Test No. | AMPS ®/ AA[2] copolymer, 30:70 mole ratio | AMPS ®/ AA copolymer, 70:30 mole ratio | AMPS ®/ AA copolymer, 80:20 mole ratio | AMPS ®/ AA copolymer, 90:10 mole ratio | AMPS ®/N-N-DMA[3]/AA terpolymer, 50:30:20 mole ratio | AMPS ®/N-N-DMA/AA terpolymer, 30:60:10 mole ratio | AMPS ®/N-N-DMA copolymer, 60:40 mole ratio | VP[4]/AMPS ®/ AA terpolymer, 30:60:10 mole ratio | VP/AMPS ®/ AA terpolymer, 60:30:10 mole ratio |
|---|---|---|---|---|---|---|---|---|---|
| 1 | 0.7 | — | — | — | — | — | — | — | — |
| 2 | — | 1.4 | — | — | — | — | — | — | — |
| 3 | — | 1.4 | — | — | — | — | — | — | — |
| 4 | — | 1.4 | — | — | — | — | — | — | — |
| 5 | — | — | 1.4 | — | — | — | — | — | — |
| 6 | — | — | — | 1.4 | — | — | — | — | — |
| 7 | — | — | — | — | — | — | 0.7 | — | — |
| 8 | — | — | — | — | 0.7 | — | — | — | — |
| 9 | — | — | — | — | 0.7 | — | — | — | — |
| 10 | — | — | — | — | — | 1 | — | — | — |
| 11 | — | — | — | — | — | 2 | — | — | — |
| 12 | — | — | — | — | — | — | — | 0.7 | — |
| 13 | — | — | — | — | — | — | — | — | 2 |

TABLE VI-continued

Pumping Time Tests Using Various Copolymers and Terpolymers and Polyethyleneimine Cross-Linking Agent[1]

| Test No. | Cross-linking Agent Concentration % by wt. of polymer composition | Type of Gelation Accelerator Added | pH | Temperature, °F. | Pumping Time, hrs. | Gel Stability and/or Comments |
|---|---|---|---|---|---|---|
| 1 | 0.47 | — | — | 186 | 3.9 | — |
| 2 | 1 | — | 10.9 | 230 | 18 | — |
| 3 | 1 | — | 10.9 | 275 | 5 | — |
| 4 | 1 | — | 10.9 | 325 | 1.5 | Gel broke in 7 days |
| 5 | 1 | — | 10.8 | 325 | 2 | Gel broke in 7 days |
| 6 | 1 | — | 10.9 | 325 | 18 | Gel broke in 2 days |
| 7 | 0.47 | — | — | 325 | — | No gel in 4 days |
| 8 | 1.75 | — | — | 325 | 12 | Gel broke in 4 days |
| 9 | 1.75 | Boric Acid | — | 325 | 4 | Gel broke in 4 days |
| 10 | 5 | — | — | 320 | 5 | Stable (>2 days) |
| 11 | 13 | — | — | 320 | 24 | Stable (>2 days) |
| 12 | 1 | — | — | 325 | 4 | — |
| 13 | 16 | — | — | 320 | — | No gel in 2 days |

[1]Type of water used was 2% KCl in all tests
[2]AA stands for acrylamide
[3]N-N-DMA stands for N-N-dimethylacrylamide
[4]VP stands for vinylpyrrolidone

EXAMPLE 5

The procedure described in Example 1 was repeated except that the polymers in the polymer composition were sulfonated styrene/maleic anhydride copolymers having various ratios of sulfonated styrene to maleic anhydride therein. The molecular weight of the polymers was approximately 10,000. In addition, various polymer to cross-linker weight ratios were tested using various types of water with and without a gelation accelerator. The results of these tests are given in Table VII below.

TABLE VII

Pumping Time Tests Using Sulfonated Styrene/Maleic Anhydride Polymers And Polyethyleneimine Cross-Linking Agent

| Test No. | Sulfonated Styrene/Maleic Anhydride Mole Ratio | Polymer: Cross-linking Agent Weight Ratio | Type of Water Used[1] | Gelation Accelerator Used - % by wt. of Polymer Composition | Temperature, °F. | Pumping Time, hrs. | Gel Stability and/or Comments |
|---|---|---|---|---|---|---|---|
| 1 | 1:1[2] | 1:0.66 | Deionized (DI) water | — | 320 | 10 | — |
| 2 | 1:1[2] | 1:0.66 | DI water | Boric Acid - 0.003 | 320 | 10 | Gel broke in 7 days |
| 3 | 1:1[3] | 1:1 | DI water | — | 320 | 10 | Gel broke in 3 days |
| 4 | 3:1[3] | 1:1 | DI water | — | 320 | 2.5 | Gel broke in 3 days |
| 5 | 3:1[3] | 1:0.5 | 2% KCl | — | 320 | — | No gelation |
| 6 | 3:1[3] | 1:1 | 2% KCl | — | 320 | — | No gelation |
| 7 | 3:1[3] | 1:1.5 | 2% KCl | — | 320 | — | No gelation |
| 8 | 1:1[4] | 1:0.5 | DI water | — | 320 | — | No gelation |
| 9 | 1:1[4] | 1:1 | DI water | — | 320 | — | No gelation |
| 10 | 1:1[4] | 1:1.5 | DI water | — | 320 | — | No gelation |
| 11 | 1:1[4] | 1:0.5 | 2% KCl | — | 320 | — | No gelation |
| 12 | 1:1[4] | 1:1 | 2% KCl | — | 320 | — | No gelation |
| 13 | 1:1[4] | 1:1.5 | 2% KCl | — | 320 | — | No gelation |
| 14 | 3:1[4] | 1:0.5 | DI water | — | 320 | — | No gelation |
| 15 | 3:1[4] | 1:1 | DI water | — | 320 | 70% gel at 5.5 hr. | Gel broke in 24 hrs. |
| 16 | 3:1[4] | 1:1.5 | DI water | — | 320 | 5.5 | Viscosity loss in 24 hr. |
| 17 | 3:1[4] | 1:1.5 | DI water | Urea - .009 | 320 | 1.5 | Gel broke in 24 hr. |
| 18 | 3:1[4] | 1:1.5 | DI water | Boric Acid - .03 | 320 | 4 | Gel broke in 24 hr. |
| 19 | 1:1[5] | 1:1.3 | DI water | — | 320 | 1.3 | Stable (>17 days) |
| 20 | 1:1[5] | 1:1.3 | 2% KCl | — | 320 | 24 | Stable (>7days) |
| 21 | 1:1[5] | 1:1.3 | DI water | Urea - 1% | 320 | 1.5 | Stable (>7days) |
| 22 | 1:1[5] | 1:1.3 | DI water | — | 320 | Stable (>17 days) | |

[1]25% by weight solutions of the polymer and 33% by weight solutions of the cross-linking agent were prepared using the type of water indicated. The solutions were used to form the polymer compositions as noted below.

TABLE VII-continued

Pumping Time Tests Using Sulfonated Styrene/Maleic Anhydride Polymers
And Polyethyleneimine Cross-Linking Agent

| Test No. | Sulfonated Styrene/Maleic Anhydride Mole Ratio | Polymer: Cross-linking Agent Weight Ratio | Type of Water Used[1] | Gelation Accelerator Used - % by wt. of Polymer Composition | Temperature, ° F. | Pumping Time, hrs. | Gel Stability and/or Comments |
|---|---|---|---|---|---|---|---|

[2]10 g of the 25% solution of polymer was mixed with 5 g of the 33% solution of cross-linking agent and the mixture was then diluted with an equal volume of DI water.
[3]The 25% solution of polymer was diluted to 5% with DI water and then mixed with the 33% solution of cross-linking agent in a weight ratio of 10 g:5 g.
[4]The 25% solution of polymer was diluted to 10% with DI water or 2% KCl as noted and was mixed with the 33% cross-linking agent in a weight ratio of 10 g:5 g.
[5]Undiluted solutions of polymer and cross-linking agent were mixed in a weight ratio of 10 g:5 g.

From Tables II–VII above, it can be seen that the pumping time of an aqueous polymer composition of this invention as well as the gel stability and the time the composition remains in a sealed zone at a high temperature can be controlled by the proper selection of the water used, the polymer or polymers used, the polymer to cross-linking agent weight ratio used and the use or non-use of a gelation accelerator.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of preventing the flow of water or gas or both through a subterranean zone having a high temperature and penetrated by a well bore at a depth such that a long pumping time is required to place a sealing composition therein comprising the steps of:
    (a) preparing a polymeric sealing composition comprised of water, a cross-linking agent selected from the group of polyalkyleneimines and mixtures of polyalkyleneimines and polyalkylenepolyamines and a selected water soluble polymer which reacts with said cross-linking agent and forms a sealing gel which is stable for a desired period of time at the temperature of said zone and has a pumping time before gelation in the presence of said cross-linking agent whereby said composition can be pumped to the depth of said zone and placed therein;
    (b) pumping said sealing composition into said zone by way of said well bore; and
    (c) allowing said sealing composition to form a cross-linked gel in said zone.

2. The method of claim 1 wherein said water soluble polymer is selected from the group consisting of polyacrylamide, AMPS®/acrylamide copolymers, sulfonated styrene/maleic anhydride copolymers, vinylpyrrolidone/AMPS®/acrylamide terpolymers, AMPS®/N-N-dimethyl-acrylamide/acrylamide terpolymers and mixtures thereof.

3. The method of claim 1 wherein said water is selected from the group consisting of fresh water, unsaturated salt water and saturated salt water.

4. The method of claim 1 wherein said cross-linking agent is polyethyleneimine.

5. The method of claim 1 wherein said subterranean zone has a temperature in the range of from about 70° F. to about 230° F., requires a pumping time in the range of from about 2 hours to about 96 hours and said water soluble polymer is polyacrylamide.

6. The method of claim 1 wherein said subterranean zone has a temperature in the range of from about 70° F. to about 230° F., requires a pumping time in the range of from about 2 hours to about 96 hours and said water soluble polymer is an AMPS®/acrylamide copolymer.

7. The method of claim 1 wherein said subterranean zone has a temperature in the range of from about 200° F. to about 350° F., requires a pumping time in the range of from about 2 hours to about 14 days and said water soluble polymer is selected from the group of vinylpyrrolidone/AMPS®/acrylamide terpolymers, AMPS®/N-N-dimethylacrylamide/acrylamide terpolymers, sulfonated styrene/maleic anhydride terpolymers and mixtures thereof.

8. The method of claim 5 wherein said cross-linking agent is polyethyleneimine and the weight ratio of said water soluble polymer to said cross-linking agent is in the range of from about 10:1 to about 400:1.

9. The method of claim 6 wherein said cross-linking agent is polyethyleneimine and the weight ratio of said water soluble polymer to said cross-linking agent is in the range of from about 10:1 to about 400:1.

10. The method of claim 7 wherein said cross-linking agent is polyethyleneimine and the weight ratio of said water soluble polymer to said cross-linking agent is in the range of from about 10:1 to about 400:1.

11. The method of claim 1 wherein said water soluble polymer is present in said sealing composition in an amount in the range of from about 0.5% to about 20% by weight of said composition.

12. The method of claim 1 wherein said cross-linking agent is polyethyleneimine and is present in said composition in an amount in the range of from about 0.05% to about 15% by weight of said composition.

13. The method of claim 1 wherein said sealing composition further comprises a gelation accelerating agent.

14. The method of claim 13 wherein said gelation accelerating agent is a pH controlling compound.

15. The method of claim 13 wherein said gelation accelerating agent is boric acid.

16. A method of preventing the flow of water or gas or both through a subterranean zone having a high temperature and penetrated by a well bore at a depth such that a long pumping time is required to place a sealing composition therein comprising the steps of:
    (a) preparing a polymeric sealing composition comprised of water, a cross-linking agent comprised of polyethyleneimine and a selected water soluble polymer which reacts with said cross-linking agent and forms a sealing gel which is stable for a desired period of time at the temperature of said zone and has a pumping time before gelation in the presence of said cross-linking agent whereby said composition can be pumped to the depth of said zone and placed therein, said water soluble polymer being selected from the group consisting of polyacrylamide, AMPS®/acrylamide copolymers, sulfonated styrene/maleic anhydride copolymers, vinylpyrrolidone/AMPS®/acrylamide terpolymers, AMPS®/N-N-dimethylacrylamide/acrylamide terpolymers and mixtures thereof;

(b) pumping said sealing composition into said zone by way of said well bore; and (c) allowing said sealing composition to form a cross-linked gel in said zone.

17. The method of claim 16 wherein said water is selected from the group consisting of fresh water, unsaturated salt water and saturated salt water.

18. The method of claim 17 wherein said water soluble polymer is present in said sealing composition in an amount in the range of from about 0.5% to about 20% by weight of said composition.

19. The method of claim 18 wherein said cross-linking agent is present in said composition in an amount in the range of from about 0.05% to about 15% by weight of said composition.

* * * * *